No. 729,258. Patented May 26, 1903.

UNITED STATES PATENT OFFICE.

EMILE GUSTAVE BERTRAND, OF PARIS, FRANCE.

PAINT OR PROTECTIVE COMPOSITION.

SPECIFICATION forming part of Letters Patent No. 729,258, dated May 26, 1903.

Application filed December 26, 1902. Serial No. 136,717. (No specimens.)

*To all whom it may concern:*

Be it known that I, EMILE GUSTAVE BERTRAND, architect, a citizen of the Republic of France, and a resident of 22 Rue Legendre, Paris, France, have invented a certain new and useful Improved Paint or Protective Composition, of which the following is a specification.

The present invention relates to a paint or composition and is destined mainly for the painting of glass houses and windows, its special property consisting in preventing to a great extent the passage of heat-rays, while at the same time letting the light-rays pass.

The paint not only prevents the internal air, say, of a greenhouse provided with glass windows coated with this composition from reaching too high a temperature, but also lowers the temperature with regard to the outside air.

A kilogram of the composition is preferably composed in the following manner: water, five hundred and fifty grams; whitening, Spanish white, or the like, two hundred and eighty-five grams; blue coloring-matter, (in the form of powder, paste, or crystal,) sixty grams; oil, eighty-five grams; alum, ten grams; silicate of potash, ten grams; total, one thousand grams. It is evident that these proportions are not arbitrary and that they can be modified according to whether a paint more or less transparent or more or less adhesive, &c., is required.

The oil which I prefer to use is linseed-oil. The blue coloring-matter may be of the kinds known as "ultramarine blue" or "Prussian blue," and it may be a blue coloring-matter in powder or paste form.

The composition is prepared and applied like ordinary paint, which it resembles in appearance and fluidity. It is applied outwardly, either like whitewash or grained or with a pad or dabber. It may be packed in a box, tub, or barrel.

The composition owes its particular feature to the presence of the blue coloring-matter, which stops the heat-rays of the sun, and the proportion in which this blue coloring-matter is mixed with the whitening, &c., allows the light-rays to pass almost entirely.

The composition is of course principally intended for use in summer as a protection against the too-vigorous effects of the sun's rays.

It may be stated that if the paint is applied at the commencement of the hot weather the various atmospheric disturbances which occur—for instance, rain and hail—gradually cause it to disappear as the season advances, so that by the time winter arrives the paint, if conveniently thick at first, will probably be quite removed, and it will be sufficient to renew it the following summer.

Having now particularly described and ascertained the nature of my said invention and in what manner the same is to be performed, I declare that what I claim is—

A paint or composition for the protection of glass houses and for other purposes, consisting of a mixture of water, whitening, blue coloring-matter, oil, alum and silicate of potash, substantially as described.

In testimony whereof I have signed my name to this specification in the presence of two subscribing witnesses.

EMILE GUSTAVE BERTRAND.

Witnesses:
  MAURICE DETOUR,
  EDWARD P. MACLEAN.